United States Patent [19]

Lavelle et al.

[11] 4,111,531
[45] Sep. 5, 1978

[54] MULTI-DIMENSIONAL CORRECTIVE SYSTEM FOR LONG RADIATION BEAMS

[75] Inventors: Joseph E. Lavelle, Wellesley; James L. Munroe, Nonantum, both of Mass.

[73] Assignee: Jersey Nuclear-Avco Isotopes, Inc., Bellevue, Wash.SHINGTON

[21] Appl. No.: 696,693

[22] Filed: Jun. 16, 1976

[51] Int. Cl.² ............................................. G02B 5/10
[52] U.S. Cl. ................... 350/293; 250/423 P; 350/299
[58] Field of Search ............... 350/286, 287, 293, 294, 350/299; 250/423 P; 356/74

[56] References Cited
PUBLICATIONS

Malone et al., *Spectrochimica Acta*, vol. 21, Aug. 1965, pp. 1361-1366.
Flournoy, *Spectrochimica Acta*, vol. 22, Jan. 1966, pp. 15-20.

*Primary Examiner*—F. L. Evans
*Attorney, Agent, or Firm*—Weingarten, Maxham & Schurgin

[57] ABSTRACT

A system for correcting misalignment and divergence in a long, propagating beam of radiation as is typically applied through a plurality of chambers to produce isotopically selective photoexcitation in a system for isotope separation. The corrective apparatus comprises a reflective relay system placed at predetermined intervals along the path of propagation of the radiation where correction of alignment and/or divergence are required. The reflective relay includes a concave mirror employed to correct divergence and which receives radiation directed at it by a first plane reflective surface which in turn responds to the radiation on the path of propagation. The concave mirror reflects toward a second plane mirror which in turn reflects the radiation back onto the path of beam propagation with correction of alignment and divergence. The first and second plane reflecting surfaces are adjustable on both tilt and position to permit alignment correction in both angle and displacement of the propagating beam of radiation.

5 Claims, 3 Drawing Figures

MULTI-DIMENSIONAL CORRECTIVE SYSTEM FOR LONG RADIATION BEAMS

FIELD OF THE INVENTION

The present invention relates to mirror systems for correcting a propagating beam of radiation.

BACKGROUND OF THE INVENTION

In a system wherein a propagating laser beam is employed for isotope separation or particularly uranium enrichment as described in U.S. Pat. No. 3,772,519 or U.S. Pat. No. 3,939,354, it is contemplated that a beam of radiation consisting of several colors of laser light will be propagated over distances of several hundred meters or more through ionization and separation chambers of the type illustrated in the above patents incorporated herein by reference. In passing through these chambers, typically containing an environment of uranium vapor, the propagating radiation beam will typically encounter a varying index of refraction. In particular, these variations may be such as to produce shifts in beam angle or actual beam displacements or a combination of these. While such shifts may appear slight within the dimensions of an individual chamber, over a long path of propagation of the radiation beam they can increase to produce an unacceptable misalignment in the beam. In addition, the propagating beam will experience a divergence, inherent in any laser beam which may or may not be augmented by its passage through a succession of ionization and separation chambers. While weak refractive elements could be introduced into the laser beam path to correct for the divergence periodically, such elements are likely to absorb unacceptably high amounts of radiation in high power laser beams resulting in not only a loss in efficiency but the generation of thermal stresses within the refractive element that could result in its failure. In addition, such a refractive element would not permit general readjustment of special and angular alignment of the beam.

SUMMARY OF THE INVENTION

The present invention teaches a system for use with high power beams of propagating radiation to correct alignment and divergence in the beam over the substantial beam path length encountered in isotope separation applications. The corrective system comprises a set of reflective surfaces, a reflective relay system, which controls beam divergence and adjusts the spacial and angular alignment of the beam. A reflective relay system more particularly includes first and second plane reflective surfaces and a concave reflective surface so positioned that radiation received along the path of propagation is directed by a first plane mirror towards the concave mirror and re-reflected towards the second plane mirror for redirection along the path of propagation. The concave reflecting surface converges the beam while the first and second plane surfaces may be adjusted in position and tilt to correct for spacial and angular misalignment.

The system thus conceived permits complete adjustment of both divergence and alignment errors with a minimal number of components and in a configuration which simplifies the adjustments necessary to provide the corrective effect.

DESCRIPTION OF THE DRAWING

These and other features of the present invention are more fully set forth below in the solely exemplary and not limiting description of the invention and the accompanying drawing of which.

DESCRIPTION OF THE INVENTION

Figure 1:
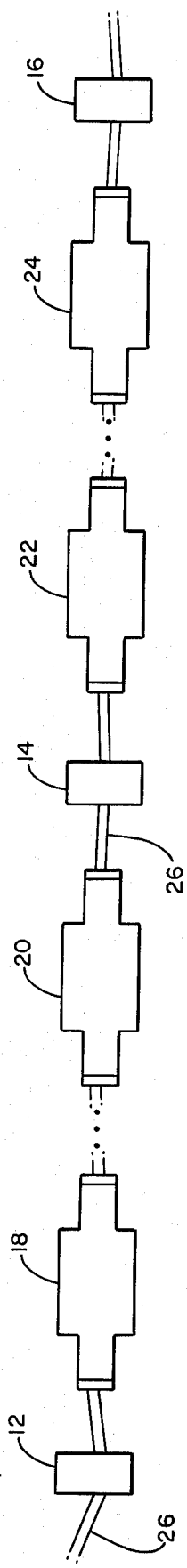
FIG. 1 is a system view of an isotope separation system having a long propagation path for radiation and showing located therealong at predetermined intervals a reflective relay system according to the present invention for correcting beam divergence and alignment.

The present invention contemplates an optical system for insertion at predetermined intervals in the propagation path of radiation used in isotope separation. By reference to FIG. 1 showing such an isotope separation system the application of the present invention may best be understood. As shown in FIG. 1, there is a series of optical realignment systems 12, 14 and 16 in accordance with the present invention separated by a plurality of isotopically selective ionization and separation chambers 18 . . . 20 and 22 . . . 24. A beam of radiation 26 passes through the optical realignment systems 12, 14 and 16, as well as the chambers 18, 20, 22 and 24 for utilization within the chambers to produce isotopically selective photoexcitation of one isotope. The chambers 18-24 may typically be as fully illustrated in the above-identified United States patents.

Since the laser beam 26, typically composed of several colors of laser radiation, must traverse a substantial distance in the propagation path through the chambers 18-24, accurate alignment of the chambers 18-24 is important to insure that the path travelled by the laser beam traverses those regions within the chambers where photoexcitation is desired. Even if the chambers 18-24, with whatever additional chambers lie along the path of beam 26, would provide a perfect optical alignment, refractive index gradients within the vapor environment of the chambers 18-24 can produce angular shifts and/or spacial displacements of the beam 26 from the intended straight line path for the beam radiation. These are shown in somewhat exaggerated form in FIG. 1 for purposes of illustration. In actual practice, these alignment shifts will be slight but over the substantial lengths traversed by the beam 26, amounting typically to several hundreds of meters in production plant utilization, the resulting beam deviation would be intolerable.

In addition, the beam 26 will experience a divergence or gradual enlarging of the cross-sectional area which will ultimately result in a loss of a significant portion of the radiation beyond the fringes of the areas of utilization within the chambers 18-24 if not corrected for.

Figure 2:
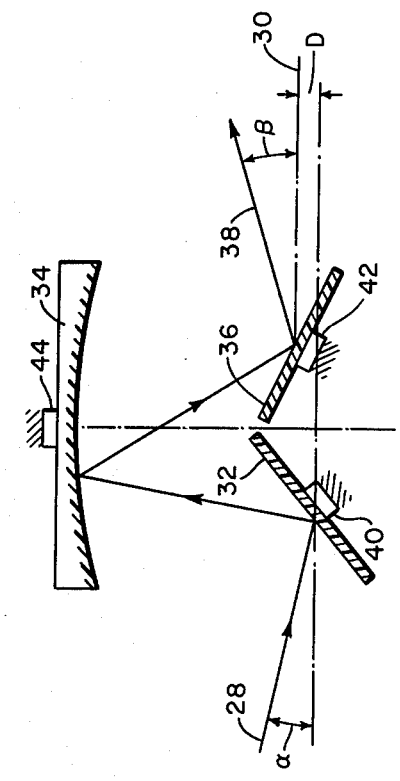
FIG. 2 is a detailed sectional view of a reflective relay optic system for use in FIG. 1.

The optical realignment systems 12, 14 and 16 are provided in accordance with the present invention to correct for these errors in the propagating beam of radiation. A typical such corrective system is illustrated in detail in FIG. 2 showing an incoming beam ray 28 of laser radiation at an angle, alpha, to its nominal trajectory 30 and striking a plane reflecting mirror 32 where it is redirected toward a concave reflecting mirror 34 and in turn reflected toward a second plane reflecting mirror 36 which redirects the radiation on an output beam path 38 forming an angle, beta, to the nominal path 30. The mirrors 32, 34 and 36 are typically low loss reflective surfaces formed by dielectric layers which provide substantially total reflection of all colors in the beam 28 of laser radiation. The fabrication of such reflective surfaces are known art and depend for their composition upon the specific frequencies desired in the beam 28. The beam 28 is changed in angle by a total angle of alpha plus beta and adjusted spacially by a displacement D by which its point of incidence upon the mirror 32 is located off from the reference direction 30. Typically, the orientation of the exiting beam 38 will be along a straight line path centered through the region of photoexcitation within the ionization and separation chambers unless some precorrection is intended or desired in the beam.

The correction provided by the angles alpha and beta and the displacement D can be adjusted by adjustable supports 40 and 42 for the respective mirrors 32 and 36. A support 44 for the mirror 34 may be adjustable as well.

The angles alpha and beta may be made equal or may differ. These angles along with the magnitude of the correction in displacement D and, the radius of curvature of the reflective surface 34 are determined in accordance with the beam correction desired in a particular application. They may each be adjusted or set independently thereby providing a high degree of flexibility in controlling beam divergence and/or alignment.

The distance separating mirror 34 from the mirrors 32 and 36 is not critical and may be selected generally for convenience. While the mirrors 32 and 36 are typically adjacent to each other and the surface areas of the mirrors 32, 34 and 36 are determined by the cross-sectional area of the beam 28, possible variations with time may occur in it. The surfaces of these mirrors are thus preferably larger than the cross-sectional area of the radiation in the beam at the angle of incidence.

The embodiment shown in FIG. 2 also permits beam refocusing to correct divergence with complete control over angular spacial shifts which may indeed be made zero if desired. The magnification for the mirror 34 being unity no spherical aberration is present. In addition, the mirror 34 functions not only to correct for beam divergence but to compensate for focus effects produced on the beam by passing through an inhomogeneous region of the medium.

The only significant aberration is astigmatism which is balanced by changing the orientation of each sequential realignment system 12, 14 and 16. Specifically, each sequential system is rotated in orientation about optical axis 26 by 90°. In the case of sequential systems it is desired to place them such that the spherical mirrors 34 etc. are separated along the optical path by one or two radii of curvature of these mirrors.

Figure 3:
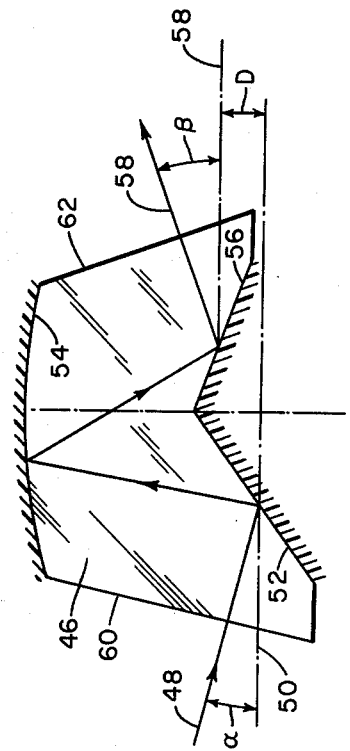
FIG. 3 is a view of an alternative reflective relay system.

Illustrated in FIG. 3 is an alternative form for the invention in which the reflecting surfaces comprise outer surfaces of a prism 46. Accordingly, an input beam of laser radiation 48 at an angle, alpha, to an axis 50 defined as above is received on a plane reflecting surface 52 of the prism 46 where it is redirected to a spherical concave surface 54 for reflection to a second plane surface 56 and ultimate redirection onto an output beam path 58 forming an angle, beta, with the axis 50. The prism 46 has faces 60 and 62 through which the beams 48 and 58 pass and which are further inclined perpendicularly to those respective beams. The embodiment of FIG. 3 employing a solid prism of quartz may be used where low power applications are involved. Also the angles, displacements and radius of curvature must be known in advance since they are fixed once the prism is made. The embodiment of FIG. 2 is not so limited and even permits dynamic adjustment where employed with a feedback system of appropriate design.

The above recited preferred embodiments are exemplary only, the true scope of the invention being defined only by the following claims.

What is claimed:

1. A reflective relay system for realigning long beams of radiation comprising:
   a propagating beam of radiation;
   a first long channel through which said propagating beam travels along an axis, said beam exiting said first channel with a divergence characteristic and centered about a first axis at a predetermined orientation;
   a first plane reflecting surface positioned to receive said propagating radiation beam from said first channel along said axis and redirect it;
   a concave reflecting surface positioned to receive radiation from said first plane reflective surface;
   the curvature of said concave reflecting surface being related to the divergence of said propagating beam of radiation to produce cnvergence of the radiation redirected thereby;
   a second channel having an axis with a predetermined displacement and angular orientation with respect to the axis of said first channel;
   a second plane reflecting surface positioned to receive the radiation redirected from said concave reflecting surface and redirect it along the axis of said second channel.

2. The system of claim 1 wherein said first and second plane reflecting surfaces and said concave reflecting surface are mirrors.

3. The system of claim 1 wherein said first and second plane reflecting surfaces and said concave plane reflecting surface are exterior faces of a prism.

4. The system of claim 1 further including means associated with each of said first and second plane reflecting surfaces and said concave reflecting surface to permit adjustment in the angle made between the propagating beam of radiation received by said first plane reflecting surface and the beam of radiation redirected by said second plane reflecting surface and in the displacement therebetween.

5. A reflective relay system for realigning long beams of radiation comprising:
   a propagating beam of radiation;
   a first plane reflecting surface positioned to receive said propagating radiation beam and redirect it;
   a concave reflecting surface positioned to receive radiation from said first plane reflective surface;
   said propagating beam of radiation having a divergence therein;
   the curvature of said concave reflecting surface being related to the divergence of said propagating beam of radiation to produce convergence of the radiation redirected thereby;
   a second plane reflecting surface positioned to receive the radiation redirected from said concave reflecting surface and redirect it;
   said first and second plane reflecting surfaces and said concave reflecting surface defining a reflective relay unit; and
   a plurality of reflective relay units being provided along and in the beam path with each sequential unit rotated approximately 90° about the direction of beam propagation with respect to the most proximate relay unit.

* * * * *